US010452832B2

(12) United States Patent
Bell et al.

(10) Patent No.: US 10,452,832 B2
(45) Date of Patent: *Oct. 22, 2019

(54) AURAL CUING PATTERN BASED MOBILE DEVICE SECURITY

(71) Applicant: International Business Machines Corporation, Armonk, NY (US)

(72) Inventors: Denise A. Bell, Austin, TX (US); Lisa Seacat DeLuca, San Francisco, CA (US); Jana H. Jenkins, Raleigh, NC (US); Trevor Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,763

(22) Filed: Dec. 1, 2017

(65) Prior Publication Data

US 2018/0096126 A1    Apr. 5, 2018

Related U.S. Application Data

(63) Continuation of application No. 13/927,420, filed on Jun. 26, 2013, now Pat. No. 9,886,570, which is a
(Continued)

(51) Int. Cl.
*G06F 17/30* (2006.01)
*G06F 21/36* (2013.01)
*G06F 7/04* (2006.01)

(52) U.S. Cl.
CPC ........ *G06F 21/36* (2013.01); *G06F 2221/031* (2013.01)

(58) Field of Classification Search
CPC ..................... G06F 21/36; G06F 2221/031
(Continued)

(56) References Cited

U.S. PATENT DOCUMENTS 4,037,200 A    7/1977  Cranmer
6,469,695 B1*  10/2002 White ................... G06F 3/0488
                                                   178/18.01
(Continued)

FOREIGN PATENT DOCUMENTS

CN    101325768    12/2008
CN    101943997    1/2011
(Continued)

OTHER PUBLICATIONS

"U.S. Appl. No. 13/547,660 Final Office Action", dated Feb. 2, 2016, 15 pages.
(Continued)

*Primary Examiner* — Gary S Gracia
(74) *Attorney, Agent, or Firm* — DeLizio Law, PLLC (57) ABSTRACT

When visual focus on a mobile device is limited, aural cues can be used to aid in entering a pattern based access code. The mobile device displays a plurality of positions from which an access code for accessing a mobile device can be selected. Indications of a set of positions of the plurality of positions in a sequence are received. The sequence of the set of the positions form an access code. For at least the first of the set of positions, an aural cue associated with the first position is determined, and the aural cue is emitted to indicate the first position based on the aural cue. It is determined whether the access code is correct. Access to the mobile device is allowed if the access code is correct.

20 Claims, 6 Drawing Sheets

Related U.S. Application Data continuation of application No. 13/547,660, filed on Jul. 12, 2012, now Pat. No. 9,430,633.

(58) Field of Classification Search
USPC .......................................... 726/19; 455/411
See application file for complete search history.

(56) References Cited

U.S. PATENT DOCUMENTS

| | | | | |
|---|---|---|---|---|
| 7,030,882 B1* | 4/2006 | Kato | ...................... | G06T 13/40 |
| | | | | 345/419 |
| 7,420,480 B2 | 9/2008 | Morris | | |
| 7,653,818 B2* | 1/2010 | Serpa | ...................... | G06F 21/31 |
| | | | | 340/5.54 |
| 8,509,734 B1* | 8/2013 | Gupta | ...................... | G06Q 20/04 |
| | | | | 455/406 |
| 8,832,804 B1* | 9/2014 | Casey | ...................... | G06F 21/31 |
| | | | | 704/273 |
| 8,873,147 B1* | 10/2014 | Rhodes | .............. | G02B 27/0172 |
| | | | | 359/630 |
| 9,336,779 B1* | 5/2016 | Patel | ...................... | G06F 21/36 |
| 2002/0109677 A1 | 5/2002 | Taylor | | |
| 2005/0253817 A1* | 11/2005 | Rytivaara | ............ | G06F 3/04883 |
| | | | | 345/173 |
| 2005/0278545 A1* | 12/2005 | Adams | ................. | H04L 63/083 |
| | | | | 713/183 |
| 2006/0092177 A1 | 5/2006 | Blasko | | |
| 2006/0174339 A1* | 8/2006 | Tao | ......................... | G06F 21/36 |
| | | | | 726/18 |
| 2006/0179471 A1* | 8/2006 | Roth | ....................... | G06F 21/31 |
| | | | | 726/2 |
| 2006/0267931 A1 | 11/2006 | Vainio et al. | | |
| 2006/0278701 A1 | 12/2006 | Matsushita et al. | | |
| 2007/0006301 A1* | 1/2007 | Nickell | ................... | G06F 21/46 |
| | | | | 726/22 |
| 2007/0246529 A1* | 10/2007 | Lalo | ...................... | G06K 19/077 |
| | | | | 235/380 |
| 2008/0184360 A1* | 7/2008 | Kornilovsky | ......... | G06F 3/0362 |
| | | | | 726/17 |
| 2008/0186282 A1 | 8/2008 | Nix et al. | | |
| 2008/0235788 A1 | 9/2008 | El Saddik et al. | | |
| 2009/0125799 A1* | 5/2009 | Kirby | ................. | H04N 1/00464 |
| | | | | 715/234 |
| 2009/0253410 A1* | 10/2009 | Fitzgerald | ............... | G06F 21/88 |
| | | | | 455/411 |
| 2010/0081476 A1* | 4/2010 | Markiewicz | ........ | G06F 3/04886 |
| | | | | 455/566 |
| 2010/0328224 A1* | 12/2010 | Kerr | .................... | G06F 3/04883 |
| | | | | 345/173 |
| 2011/0105193 A1* | 5/2011 | Lee | ...................... | G06F 3/0488 |
| | | | | 455/566 |
| 2011/0237220 A1* | 9/2011 | Matsuoka | ......... | H04M 1/72577 |
| | | | | 455/411 |
| 2011/0248916 A1 | 10/2011 | Griffin et al. | | |
| 2011/0260829 A1* | 10/2011 | Lee | ....................... | G06F 3/0414 |
| | | | | 340/5.51 |
| 2011/0294467 A1 | 12/2011 | Kim et al. | | |
| 2011/0294476 A1* | 12/2011 | Roth | .................... | H04M 1/271 |
| | | | | 455/414.1 |
| 2012/0004931 A1* | 1/2012 | Thierman | ............... | G06Q 10/06 |
| | | | | 705/3 |
| 2012/0060668 A1* | 3/2012 | Lengeling | ................ | G10H 1/42 |
| | | | | 84/645 |
| 2012/0071208 A1* | 3/2012 | Lee | .................. | H04M 1/72544 |
| | | | | 455/566 |
| 2012/0084734 A1* | 4/2012 | Wilairat | .................. | G06F 21/36 |
| | | | | 715/863 |
| 2012/0099406 A1* | 4/2012 | Lau | ....................... | G04G 21/08 |
| | | | | 368/69 |
| 2012/0167202 A1* | 6/2012 | Kim | ........................ | G06F 21/42 |
| | | | | 726/19 |
| 2012/0195436 A1* | 8/2012 | Nakadai | ................. | H04R 3/005 |
| | | | | 381/56 |
| 2012/0204258 A1* | 8/2012 | Lee | ......................... | G06F 21/36 |
| | | | | 726/19 |
| 2012/0218194 A1* | 8/2012 | Silverman | ............... | G06F 3/016 |
| | | | | 345/173 |
| 2012/0237908 A1* | 9/2012 | Fitzgerald | ............... | G06F 21/88 |
| | | | | 434/236 |
| 2012/0252414 A1* | 10/2012 | Ishidoshiro | ........... | H04L 63/083 |
| | | | | 455/411 |
| 2012/0256723 A1* | 10/2012 | Grover | .................... | G06F 21/31 |
| | | | | 340/5.8 |
| 2013/0086666 A1* | 4/2013 | Cheng | ..................... | G06F 21/32 |
| | | | | 726/7 |
| 2013/0101127 A1* | 4/2013 | Buchmann | ........... | H04R 29/005 |
| | | | | 381/58 |
| 2013/0113723 A1* | 5/2013 | Chen | ....................... | G06F 21/30 |
| | | | | 345/173 |
| 2013/0120278 A1* | 5/2013 | Cantrell | .............. | G06F 3/04886 |
| | | | | 345/173 |
| 2013/0185750 A1* | 7/2013 | Ayoub | ............. | H04N 21/25841 |
| | | | | 725/34 |
| 2013/0251125 A1* | 9/2013 | DeLuca | .................. | H04M 3/56 |
| | | | | 379/93.02 |
| 2013/0297319 A1* | 11/2013 | Kim | ........................ | G10L 15/22 |
| | | | | 704/275 |
| 2014/0018038 A1 | 1/2014 | Bell et al. | | |
| 2014/0020087 A1* | 1/2014 | Ooi | ......................... | G06F 21/36 |
| | | | | 726/19 |
| 2014/0020088 A1 | 1/2014 | Bell et al. | | |
| 2014/0120884 A1* | 5/2014 | Hymel | ................ | H04M 3/5335 |
| | | | | 455/413 |

FOREIGN PATENT DOCUMENTS

| | | |
|---|---|---|
| CN | 101986251 | 3/2011 |
| CN | 102043566 | 5/2011 |
| CN | 102184078 | 9/2011 |
| CN | 102221922 | 10/2011 |
| CN | 102402366 | 4/2012 |
| CN | 102520861 | 6/2012 |
| JP | 2001034396 | 2/2001 |
| JP | 2002318904 | 10/2002 |
| KR | 20130052164 | 11/2011 |

OTHER PUBLICATIONS

"U.S. Appl. No. 13/547,660 Final Office Action", dated May 1, 2015, 17 pages.
"U.S. Appl. No. 13/547,660 Office Action", dated Sep. 24, 2015, 16 pages.
"U.S. Appl. No. 13/547,660 Office Action", dated Dec. 5, 2014, 16 pages.
"U.S. Appl. No. 13/927,420 Final Office Action", dated Mar. 23, 2017, 17 pages.
"U.S. Appl. No. 13/927,420 Final Office Action", dated Jun. 29, 2016, 17 pages.
"U.S. Appl. No. 13/927,420 Office Action", dated Jan. 29, 2015, 15 Pages.
"U.S. Appl. No. 13/927,420 Office Action", dated Mar. 25, 2016, 19 pages.
"U.S. Appl. No. 13/927,420 Office Action", dated Sep. 25, 2015, 19 pages.
"U.S. Appl. No. 13/927,420 Office Action", dated Oct. 20, 2016, 24 pages.
"U.S. Appl. No. 13/927,420 Office Action", dated May 7, 2015, 18 Pages.
"U.S. Appl. No. 13/927,420 Office Action", dated Jun. 14, 2017, 20 pages.
Azenkot, et al., "PassChords: Secure Multi-Touch Authentication for Blind People", ASSETS'12, Oct. 22-24, 2012, Boulder, Colorado, USA., 2012, pp. 159-166.
Bianchi, et al., "Spinlock: A Single-Cue Haptic and Audio PIN Input Technique for Authentication", Madera ITI, University of Madeira, Funchal, Portugal, 2011, 10 pages.

(56) References Cited

OTHER PUBLICATIONS

Bianchi, et al., "The Phone Lock: Audio and Haptic Shoulder-Surfing Resistant PIN Entry Methods for Mobile Devices", TEI, Jan. 22-26, 2011, 4 pages.

Bianchi, et al., "The Secure Haptic Keypad: A Tactile Password System", CHI, Atlanta, Georgia, USA., Apr. 10-15, 2010, 5 pages.

Kuber, et al., "Feasibility studyoftactile-basedauthentication", International Journal of Human-Computer Studies, Mar. 2010, pp. 158-181.

Kuber, et al., "Toward Tactile Authentication for Blind Users", UMBC, Proceedings of the 12th International ACM SIGACCESS Conference, Oct. 25-27, 2010, 2 pages.

* cited by examiner

FIG. 6

AURAL CUING PATTERN BASED MOBILE DEVICE SECURITY

RELATED APPLICATIONS

This application is a continuation application that claims the benefit of U.S. patent application Ser. No. 13/927,420, filed Jun. 26, 2013, which is a continuation application that claims the benefit of U.S. patent application Ser. No. 13/547,660, filed Jul. 12, 2012.

BACKGROUND

Embodiments of the inventive subject matter generally relate to the field of mobile devices, and, more particularly, to aural feedback pattern based security access mechanisms for mobile devices.

Conventional security mechanisms for mobile devices include passwords or personal identification numbers (PINs). A user enters his/her password via a mechanical keypad or a touchscreen keypad.

SUMMARY

Embodiments of the inventive subject matter include a method that provides aural cues for a pattern based security mechanism. A plurality of positions from which an access code for accessing a mobile device can be selected is displayed. Indications of a set of positions of the plurality of positions in a sequence are received. The sequence of the set of the positions form an access code. For at least the first of the set of positions, an aural cue associated with the first position is determined, and the aural cue is emitted to indicate the first position based on the aural cue. It is determined whether the access code is correct. Access to the mobile device is allowed if the access code is correct.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Pattern based security mechanisms have been suggested to obfuscate passwords or PINs and hinder observation of a password or PIN. The obfuscation techniques involve heightened visual attention. A music based security mechanism has been suggested as a replacement for conventional passwords and PINs. The complexity of the music based security mechanism (e.g., advancing through multiple screens) limits utility in environments that limit visual focus on a mobile device. Securing a mobile device with a pattern paired with aural cues ("aural cuing pattern security mechanism") reduces demand for visual attention without being hindered by complexity. For instance, daylight may wash out a display of a mobile device in a low-power mode. A user may need to access his/her mobile device without diverting visual attention from another objection or situation. In addition, the aural cuing pattern security mechanism alleviates the challenges of securing mobile devices for populations with impaired vision while preserving security integrity.

A security module of a mobile device can be configured/programmed to allow a user to set a sequence of positions (i.e., pattern) and aural cues for the positions to unlock the mobile device. In response to an unlock action, the mobile device displays multiple positions (e.g., grid of positions), each of which are associated with an aural cue. The aural feedback can be a single tone, multiple tones, an audio clip, a repeating tone, etc. Embodiments can associate every position with a different aural cue, associate all positions with a different number of the same tone, associate some of the positions with a same aural cue, etc. But all positions are not associated with the same number of a same aural cue. If the mobile device receives a correct pattern, then the mobile device unlocks. Based on the aural feedback of at least the starting/first position, the user, who is glancing at the mobile device or who cannot visually perceive the mobile device well, knows whether the starting position of the unlock pattern is correct.

Figure 1:
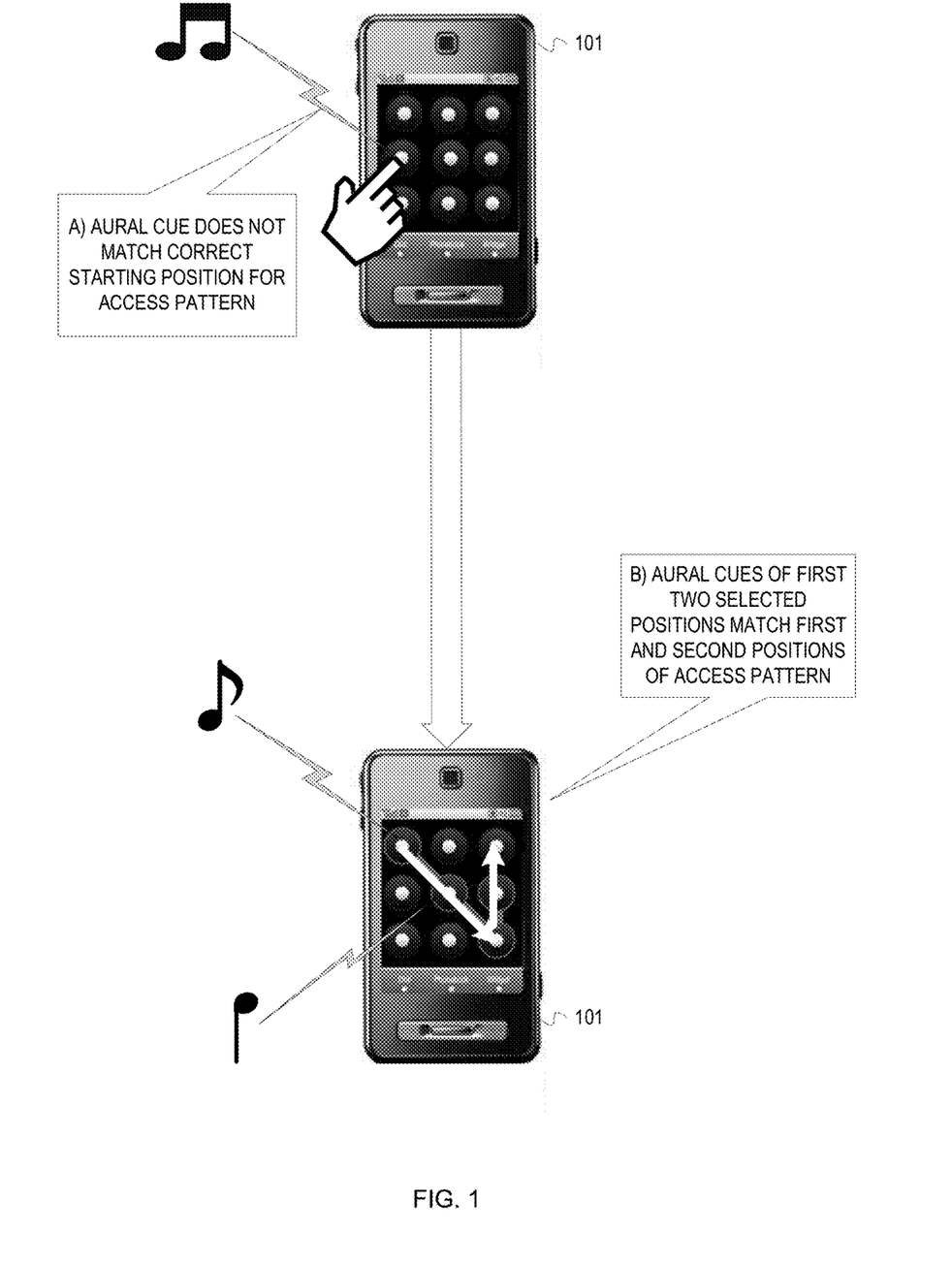
FIG. 1 depicts an example mobile phone presenting a grid of positions to unlock the mobile phone and aural cues.

FIG. 1 depicts an example mobile phone presenting a grid of positions to unlock the mobile phone and aural cues. A mobile phone 101 presents a 3×3 grid of positions. Although no icons are illustrated, each of the positions can be associated with any one of images, numbers, letters, symbols, musical notes, etc. At a stage A, a user selects the position [1,2]—first column, second row. In response to selection of the position [1,2], an aural cue is emitted from the phone. The aural cue has previously been associated with the position [1,2]. The correct initial position for the sequence of positions to unlock the phone is the position [1,1]. Without looking at the mobile phone 101, the user realizes that he/she has selected the incorrect first position to access the mobile phone 101. In stage B, the user enters the correct access pattern with the assistance of the aural cues for the first two positions of the access pattern. In this example, the correct access pattern consists of the sequence of positions" [1,1], [2,2], [3,3], [3,2], [3,1]. The user corrects and selects the position [1,1] to begin the access pattern, and hears the aural cue associated with the position [1,1]. The user then selects the second position [2,2], and hears the aural cue associated with the position [2,2]. In this example illustration, aural cues are not provided for the subsequent position selections because the mobile phone has been configured to provide the aural cues for the first two selected positions. Various configurations are possible. An aural cue can be provided for only the first selected position, half of the total positions for an access code, all of the positions, etc.

Figure 2:
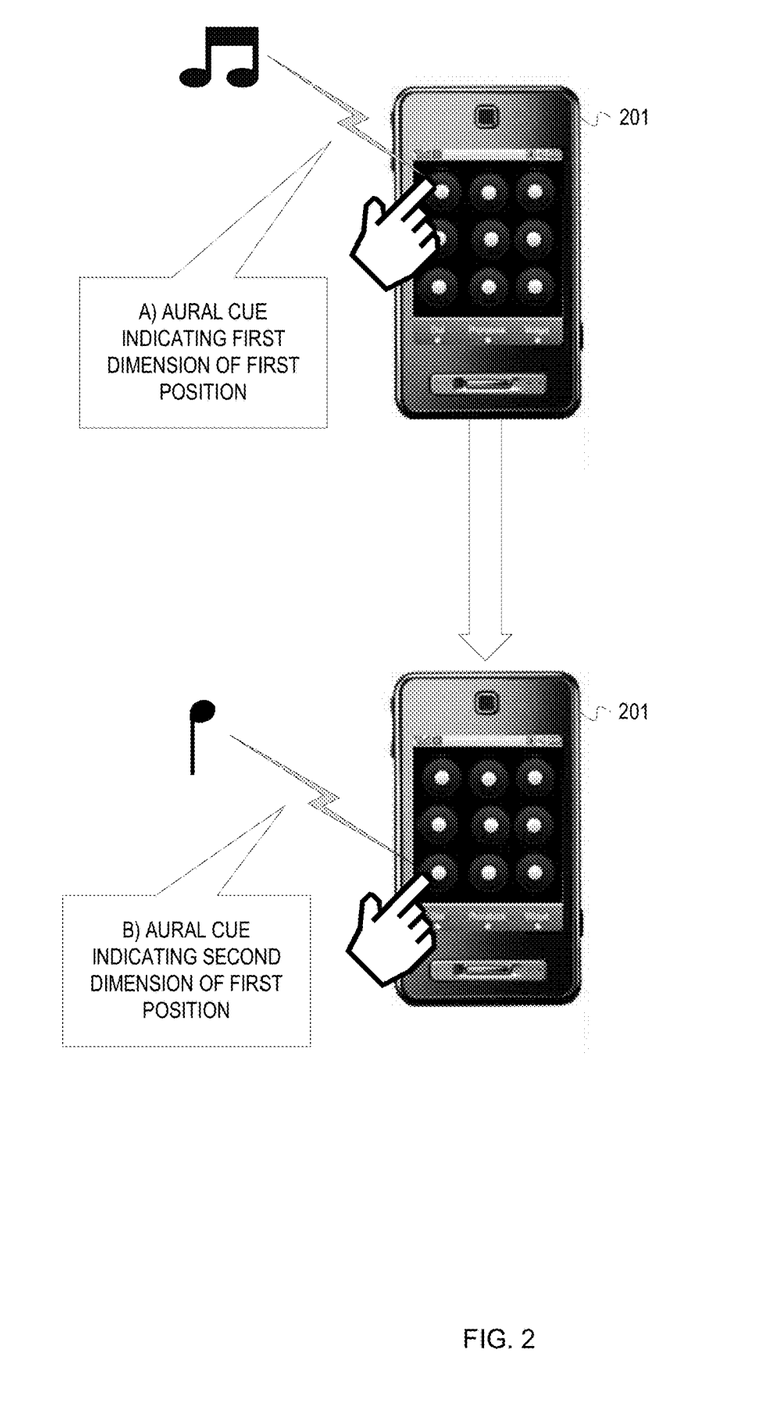
FIG. 2 depicts an example mobile phone presenting a grid of positions and aural cues based on dimensions of positions.

Although the example of FIG. 1 associated an aural cue with each position, embodiments are not so limited. Embodiments can provide distinct aural cues based on dimensions of positions instead of individual positions. FIG. 2 depicts an example mobile phone presenting a grid of positions and aural cues based on dimensions of positions. Similar to FIG. 1, a mobile phone 201 of FIG. 2 presents a 3×3 grid of positions for accessing the mobile phone 201. For this illustration, presume that the position [1,3] is the first position of the access pattern. At a stage A, a user selects a position [1,1]—first column, first row. The mobile phone 201 emits an aural cue associated with the first dimension. In other words, the aural cue indicates that the first column has been selected. The user then moves his/her finger to position [1,3]—first column, third row. In a stage B, the mobile phone 201 emits an aural cue indicating the second dimension of the first position. In other words, the second aural cue indicates that the third row has been selected. Based on the two aural cues, the user realizes that the he/she has selected the position in the third row of the first column.

FIGS. 1 and 2 depict brief use examples. A variety of configurations are possible. The following figures present example flowcharts for configuring and processing aural cued position based security of a mobile device.

Figure 3:
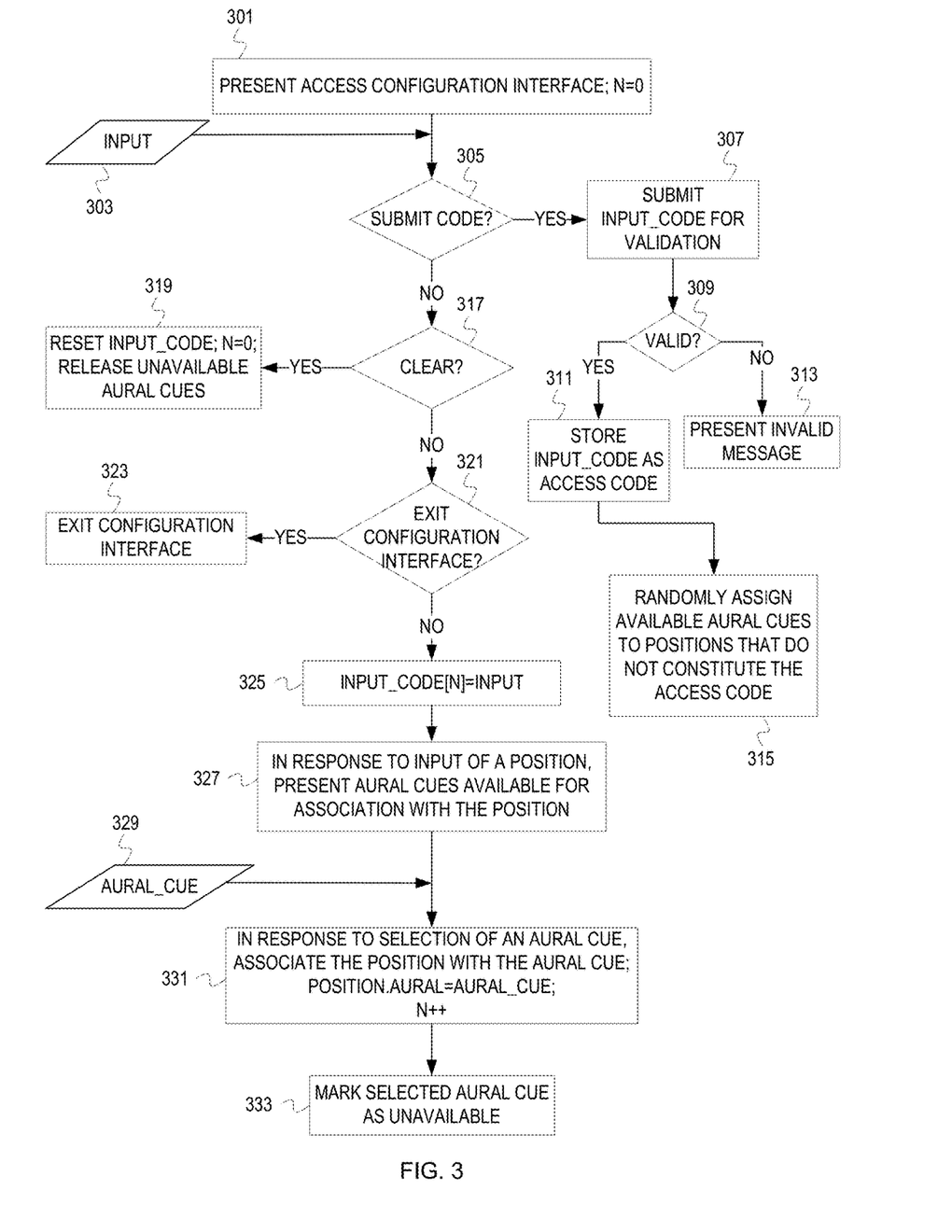
FIG. 3 depicts a flowchart of example operations for configuring a position based security access code with aural cues.

FIG. 3 depicts a flowchart of example operations for configuring a position based security access code with aural cues. The example operations of FIG. 3 allow for configuration of aural cues for each position. At block 301, an access configuration interface is presented. For example, the configuration interface may present a grid of positions, an image map, etc. A variable N is initialized to 0.

After receiving input 303, it is determined whether the input is a request to submit an input code at block 305. If the input 303 is a submit request, then control flows to block 307. Otherwise, control flows to block 317.

At block 317, it is determined if the input 303 is a clear command. If so, then control flows to block 319. If not, then control flows to block 321.

At block 319, a data structure INPUT_CODE, which temporarily hosts any input positions, is reset. This example suggests that the data structure is an array. Embodiments can use any of a variety of data structures to host inputs as appropriate for the type of inputs. In addition, N is reset to 0. Also in block 319, aural cues marked as unavailable are released or unmarked. The marking of cues as unavailable is explained in block 333.

At block 321, it is determined whether the input 303 is a request to exit the configuration interface. If so, then the configuration interface is exited at block 323. Otherwise, the input 303 is a selected position and control flows to block 325.

If the input is a selected position, then the input 303 is stored into INPUT_CODE[N] at block 325. The position may be indicated with a single value, multiple value coordinates, etc. Embodiments may encode the position instead of storing the position input. For example, a security module may generate a hash of the value(s) that indicates the position, and store the hash value.

At block 327, available aural cues are presented for association with the position in response to input or selection of the position. The aural cues can be audio clips loaded on the mobile device, audio clips recorded by a user, clips from songs, tones, etc. In this example, available aural cues are those that have not yet been assigned to a position. Different constraints can be configured for associating aural cues. For example, the security module may be configured to allow a same aural cue to be assigned to a position that is not part of an access code and the last position of an access code. Another example constraint overlap of aural cues in non-access code positions to 2.

After an aural cue 329 (AURAL_CUE) is selected from the available aural cues, the aural cue is associated with the position at block 329 in response to the selection of the aural cue. For example, the aural cue can be literally or referentially stored as a member of an object as depicted in block 329 (POSITION.AURAL=AURAL_CUE). The indexing variable N is incremented. Embodiments can also integrate the aural cue into the security access code. For example, an aural cue for a position may be a tone. A user can configure the security module to require a position and a number of taps, particular rhythm, degree of pressure, etc., at the position. So, an access code can comprise a sequence of positions as well as a configured number of taps at each position. The mobile device emits the aural cue after each tap. Embodiments can vary the aural cue to correspond to the other facet of security (e.g., increasing pace of playing the aural cue as pressure is increased). A facet of security can be considered a secondary security input or different type of input at the position to be encoded or used as a component of an access code.

At block 333, the selected aural cue is marked as unavailable. Embodiments can use a tracking structure to mark aural cues as unavailable. Embodiments can remove cues from a pool of cues available for association with a position. Unavailable cues can also be aural cues designated as undesirable or low utility. For example, a user may designate aural cues as unavailable based on past experience of not recognizing the aural cue or not being able to distinguish the aural cue from ambient sounds. Default configurations, perhaps based on testing, may flag or designate aural cues as unavailable for access due to security or safety concerns.

Each subsequent position is stored along with associated cues. Once a submit request is input, the input code (INPUT_CODE) is submitted for validation. The security module validates the INPUT_CODE against constraints (e.g., minimum length). If the INPUT_CODE is valid, then control flows to block 311. If it is not, then control flows to block 313.

At block 313, an invalid message is presented.

At block 311, INPUT_CODE is stored as the access code for the mobile device. Embodiments may encode INPUT_CODE (e.g., hash the INPUT_CODE).

At block 315, remaining available aural cues are randomly assigned to positions that do not constitute the access code. Embodiments are not limited to randomly assigning the available aural cues. Aural cues can be assigned in a linear manner (e.g., as listed in memory). Aural cues can also be assigned based on configuration. For instance, the security module can be configured to assign aural cues based on characteristics of the unavailable cues and those associated with positions of the access code/pattern. For example, the security module may assign aural cues with similar characteristics as those already assigned based on proximity of the corresponding positions. For instance, a non-access code position adjacent to an access code position would be assigned an aural cue with significantly different characteristics (e.g., pitch, volume, speed, etc.) than the aural cue associated with the access code position. Embodiments can also allow the user to associate aural cues with every position, whether part of the access code or not.

Figure 4:
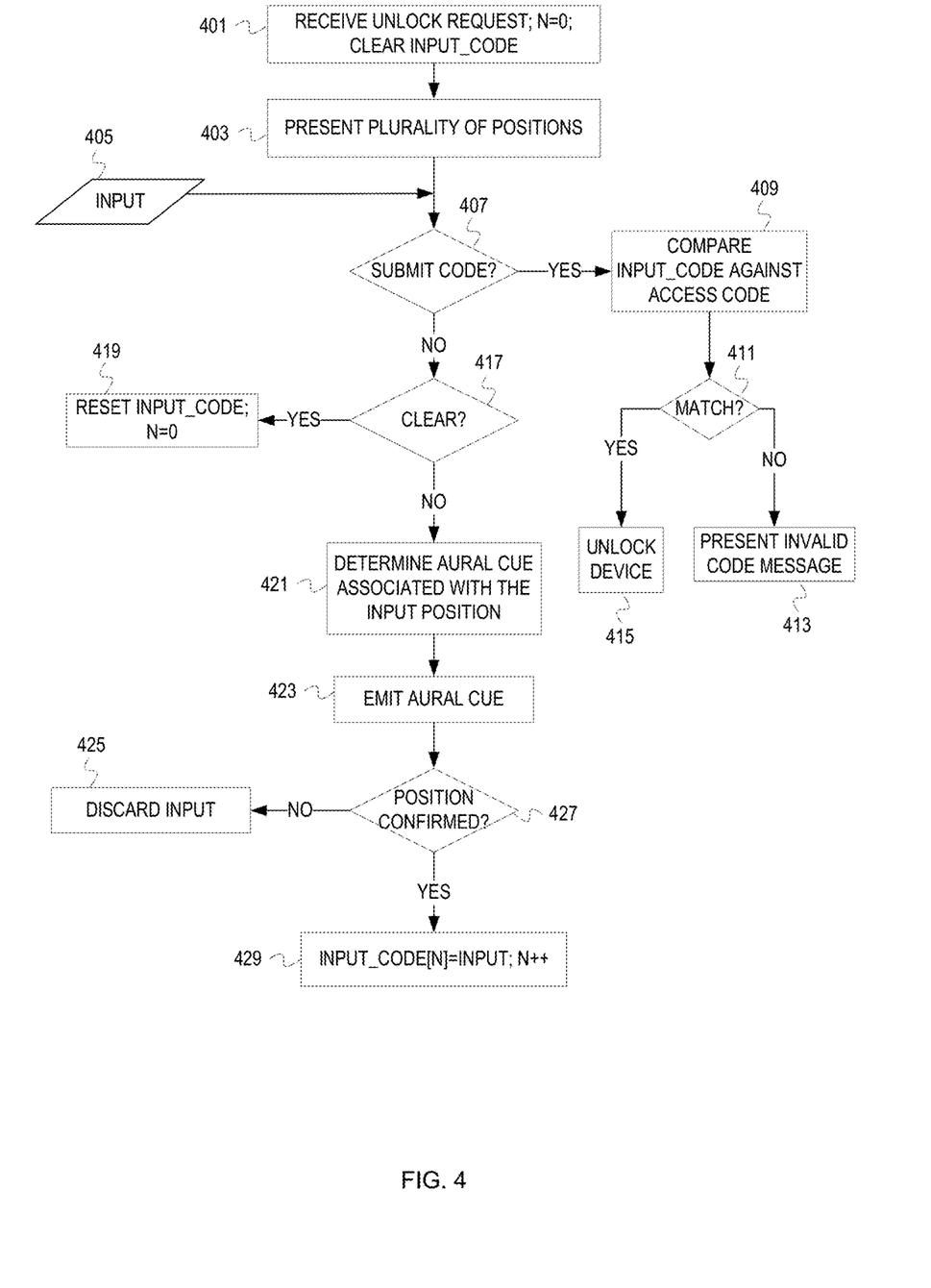
FIG. 4 depicts a flowchart of example operations for processing input access patterns and providing aural cues in response.

FIG. 4 depicts a flowchart of example operations for processing input access patterns and providing aural cues in response. At block 401, an unlock request is received on a mobile device. In response, an indexing variable N is initialized to 0 and entries of a structure INPUT_CODE are cleared (e.g., set to null).

At block 403, a plurality of positions is presented. For example, an image map or grid of positions is presented on a display of the mobile device.

After an input 405 is received, it is determined whether the input 405 is a submit request. If the input 405 is a submit request, then control flows to block 409. Otherwise, control flows to block 417.

At block 417, it is determined whether the input 405 is a clear request. If the input 405 is a clear request, then control flows to block 419. If not, then control flows to block 421 because the input is a position input (i.e., selection of one of the plurality of positions).

At block 419, the INPUT_CODE structure is reset (e.g., entries are set to null). And the indexing variable N is reset to 0.

At block 421, an aural cue associated with the input position 405 is determined. For example, a security module resolves a reference to the aural cue or looks up the aural cue in a structure indexed by an indication of the position.

At block 423, the aural cue is emitted.

At block 427, it is determined whether the position is confirmed. For example, a position can be confirmed if a user maintains selection of the position beyond a threshold period of time. Position can also be confirmed with a tap or given number of taps. Position can also be implicitly confirmed with selection of a next position without an intervening reset action. If the position is not confirmed, then control flows to block 425 where the input 405 is discarded. If the position is confirmed, then control flows to block 429.

At block 429, the input position or a representation of the input position is stored (INPUT_CODE[N]=INPUT). In addition, the indexing variable N is incremented. Embodiments are not limited to using a structured index and an indexing variable. Any of a number of data structures can be implemented to store input and the access code.

When a user request submission of an input code at block 407, then the INPUT_CODE contents are compared against the stored access code. Embodiments may encode the contents before comparing. Embodiments may encode input as added to the INPUT_CODE structured.

At block 411, it is determined whether the input code is correct. If it is correct, then the device is unlocked at block 415. If the input code is not correct, then an invalid code message is presented at block 413.

FIGS. 3 and 4 depict flowcharts of example operations that associate aural cues with each position. As depicted in FIG. 2, audio output can cue a dimension of a position instead of the specific position. For a two dimensional presentation of positions, each position will be associated with 2 cues. For the dimension based aural cuing, an aural cue is associated with each value of a dimension. Using the 3×3 grid as a reference, each of the 3 columns will be associated with a different aural cue. Each of the 3 rows will have a different aural cue. The first, second, and third columns can each be associated with a different trumpet note. The first second and third rows can each be associated with a different guitar note. When attempting to access a mobile device, a defined action will cause the security module to switch between dimensions. For example, a change from horizontal movement on a touchscreen to vertical movement will switch from column aural cues to row aural cues. As another example, a double tap will switch the security module to emit aural cues for a different dimension.

Embodiments can also provide aural cuing at a greater granularity. Instead of indicating a position alone, aural cues can be manipulated to indicate degree of precision of input selection. A user can configure a security module to increase volume of an aural cue in a center area of a position and decrease volume as a selection implement (e.g., finger, stylus, etc.) moves away from the center or center area and towards an edge of the position. Another aural cue can be configured to indicate transition into another area of a different position, or into a neutral area that is not associated with any specific position. Other configurations to cue precision of a position selection include varying number of repetitions, speed of replay, etc. The precision cues can guide a user to realign their selection implement with minimal to no visual feedback and avoid entering an entire sequence of incorrect positions. Embodiments can are not limited to using aural cues for indication of position precision. A security module can be configured to provide haptic cues in addition to or instead of the aural precision cues. For example, a mobile device can be configured via the security module to provide a greater intensity haptic cue in a center area of a position along with the aural cue that indicates the position.

It should be understood that the depicted flowcharts are provided to aid in understanding embodiments, and are not limiting upon the scope of the claims. Embodiments can perform additional operations, different operations, fewer operations, operations in parallel, etc. With reference to FIG. 3, additional operations can be performed to associate multiple cues with a position that constitutes an access code. Different aural cues can be associated based on whether the position is being selected in the proper sequence of the access pattern. If different cues are used for a same position based on whether selected in the correct sequence, then embodiments can perform operations to track state of an access code position in order to determine which cue to emit. Additional operations can also be performed to allow a user to configure a security module to emit an aural cue a number of times while a position is held. For example, the aural cue for position [2,2] will repeat twice with a 2 second gap while the position selection is maintained (e.g., while a finger remains on that position). With reference to FIG. 4, additional operations can be performed to look up other cues, whether aural or non-aural depending upon other security facets (e.g., pressure, taps, etc.) and conditions.

Figure 5:
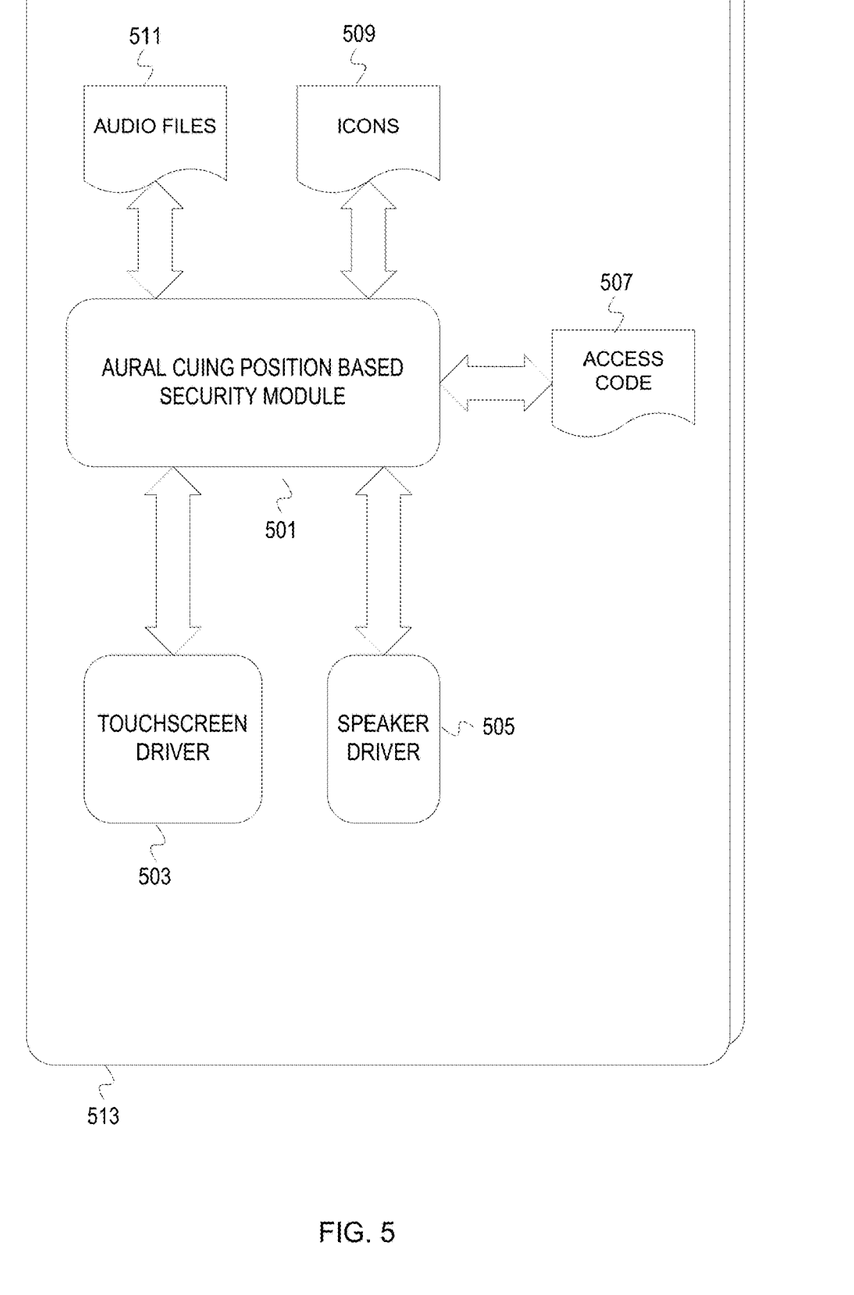
FIG. 5 depicts a mobile device with an example security module that uses aural cues for position based security.

FIG. 5 depicts a mobile device with an example security module that uses aural cues for position based security. FIG. 5 depicts a mobile device 513. The mobile device 513 comprises a touchscreen driver 503 and a speaker driver 505. The mobile device 513 also comprises an aural cuing position based security module 501. The mobile device 513 also comprises machine-readable storage media that hosts audio files 511 and icons 509. The machine-readable storage media also hosts an access code 507 once configured with the security module 501.

The security module 501 accesses the icons 509 and the audio files 511 in accordance with configurations. The security module 501 associates selected ones of the audio files 511 with positions that are presented for unlocking the mobile device 513. The security module also maps or associates selected ones of the icons 509 to positions presented for accessing the mobile device 513. The security module 501 interacts (e.g., invokes via an application programming interface) with the touchscreen driver 503 to present a configuration interface and to present selectable positions for accessing the mobile device 513. The security module 501 also interacts with the speaker driver 505 to emit aural cues during configuration and when a user attempts to access the mobile device 513.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
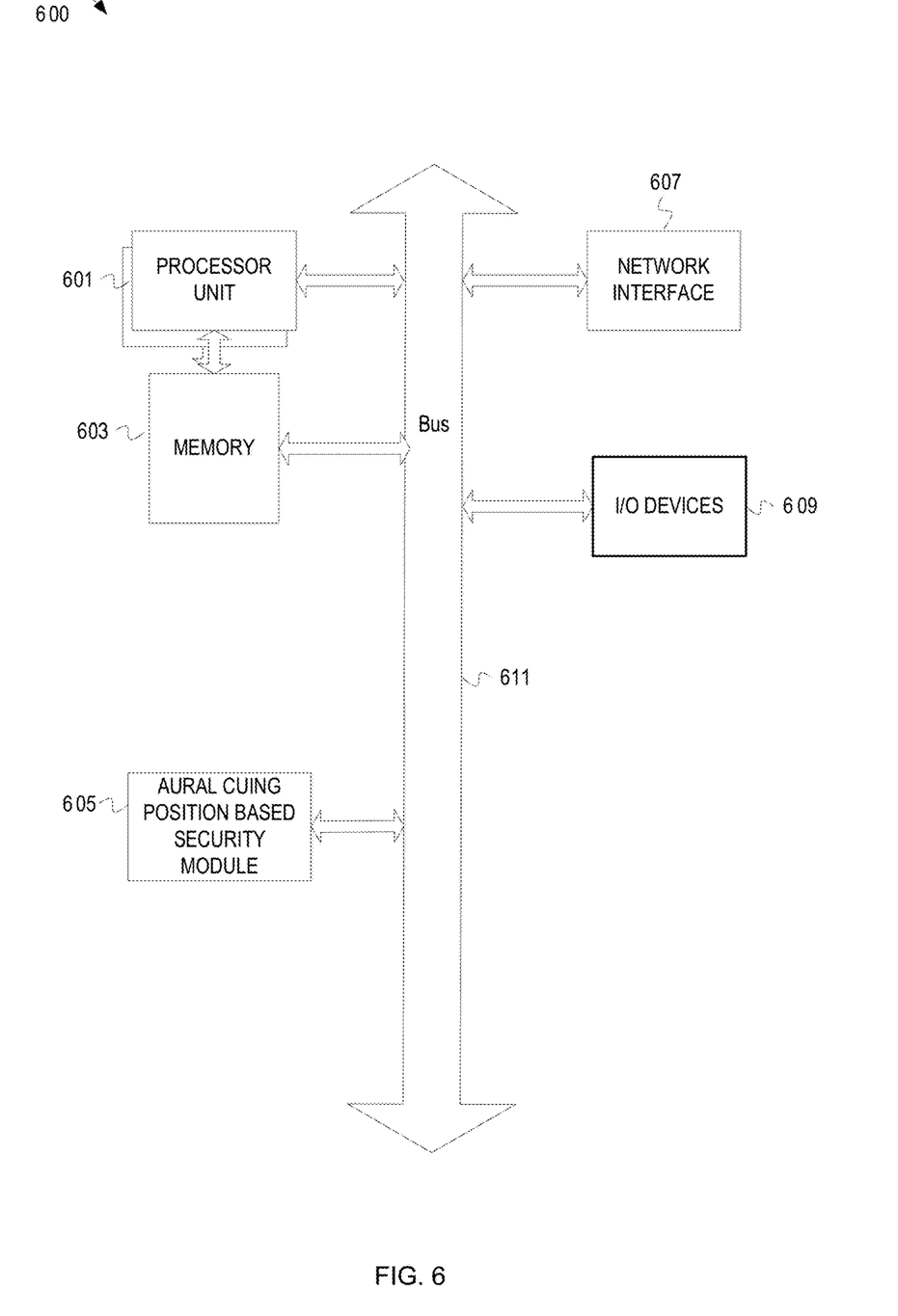
FIG. 6 depicts an example mobile device with an aural cuing position based security module.

FIG. 6 depicts an example mobile device with an aural cuing position based security module. A mobile device 600 includes a processor unit 601 (possibly including multiple processors, multiple cores, multiple nodes, and/or implementing multi-threading, etc.). The mobile device 600 includes memory 603. The memory 603 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The mobile device 600 also includes a bus 611 (e.g., PCI bus, ISA bus, PCI-Express bus, HyperTransport® bus, InfiniBand® bus, NuBus bus, etc.), an aural cuing position based security module 605, and a network interface 607 (e.g., an Ethernet interface, wireless interface, etc.). The aural cuing position based security module 605 associates audio with selectable positions for securing a mobile device. The security module 605 associates the audio to be emitted by the mobile device 600 as cues to position when a user attempts to access/unlock the mobile device 600 in a situation or environment that limits visual focus, quality, or attention. As a user selects positions from a plurality of positions for unlocking the mobile device 600, the audio is played as aural cues. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the security module 605, and the network interface 607 are coupled to the bus 611. Although illustrated as being coupled to the bus 611, the memory 603 may be coupled to the processor unit 601.

While the embodiments are described with reference to various implementations and exploitations, it will be understood that these embodiments are illustrative and that the scope of the inventive subject matter is not limited to them. In general, techniques for providing aural cues to positions selected to access a mobile device as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a device, comprising:
    determining a plurality of audio tones;
    presenting, via a display of the device, an image map or grid of positions associated with a plurality of positions corresponding to the plurality of audio tones;
    receiving a user input that is indicative of: (i) a selection of a plurality of selected audio tones from the plurality of audio tones, and (ii) an assembly order of the plurality of selected audio tones;
    responsive to an initial selection of the user input, providing a first audible feedback indicating whether the initial selection is a correct starting position for a password entry based on the selection and the assembly order, the first audible feedback comprising first aural content when the initial selection is the correct starting position and the first audible feedback comprising second aural content when the initial selection is not the correct starting position;
    receiving a subsequent selection of the user input when the initial selection is the correct starting position and providing a third audible feedback comprising a third aural content indicating whether the subsequent selection is a correct subsequent position or incorrect subsequent position for the assembly order;
    discarding the user input when the initial selection is not the correct starting position;
    generating the password entry based on the selection and the assembly order indicated by the user input; and
    authenticating a user for access to a computer based resource using the password entry.

2. The method of claim 1, wherein the user input is received via a user interface (UI) for entering data, the UI provided on a touch screen of the device.

3. The method of claim 2, wherein the UI is arranged according to a grid of positions, and wherein the UI is configured to provide audible feedback.

4. The method of claim 3, further comprising:
    responsive to a touch input at a first grid position, providing audible feedback specific to the first grid position according to a policy.

5. The method of claim 4, wherein the policy is modifiable by the user of the computer based resource.

6. The method of claim 4, wherein the first audible feedback is dependent on a proximity of the touch input to a center area of the first grid position.

7. The method of claim 4, wherein the first audible feedback specific to the first grid position is different from a second audible feedback that otherwise would be provided for the touch input at a second grid position.

8. The method of claim 1, wherein authenticating the user includes comparing the password entry with a stored credential represented as a pattern-based access code.

9. A system, comprising:
    a processor; and
    memory having instructions stored therein which, when executed by the processor of a device, cause the device to:
    determine a plurality of audio tones;
    present, via a display of the device, an image map or grid of positions associated with a plurality of positions corresponding to the plurality of audio tones;
    receive a user input that is indicative of: (i) a selection of a plurality of selected audio tones from the plurality of audio tones, and (ii) an assembly order of the plurality of selected audio tones;
    responsive to an initial selection of the user input, provide a first audible feedback indicating whether the initial selection is a correct starting position for a password entry based on the selection and the assembly order, the first audible feedback comprising first aural content when the initial selection is the correct starting position and the first audible feedback comprising second aural content when the initial selection is not the correct starting position;
    receive a subsequent selection of the user input when the initial selection is the correct starting position and providing a third audible feedback comprising a third aural content indicating whether the subsequent selection is a correct subsequent position or incorrect subsequent position for the assembly order; discard the user input when the initial selection is not the correct starting position;
    generate the password entry based on the selection and the assembly order indicated by the user input; and
    authenticate a user for access to a computer based resource using the password entry.

10. The system of claim 9, wherein the user input is received via a user interface (UI) for entering data, the UI provided on a touch screen of the device.

11. The system of claim 10, wherein the UI is arranged according to a grid of positions, and wherein the UI is configured to provide audible feedback.

12. The system of claim 11, wherein the instructions, when executed by the processor, cause the device to:
    responsive to a touch input at a first grid position, provide audible feedback specific to the first grid position according to a policy.

13. The system of claim 12, wherein the policy is modifiable by the user of the computer based resource.

14. The system of claim 9, wherein authenticating the user includes comparing the password entry with a stored credential represented as a pattern-based access code.

15. A computer program product for use with a question answering system, the computer program product comprising a non-transitory computer readable storage medium having instructions embodied therewith, the instructions executable by a processor of a device to cause the device to:
determine a plurality of audio tones;
present, via a display of the device, an image map or grid of positions associated with a plurality of positions corresponding to the plurality of audio tones;
receive a user input that is indicative of: (i) a selection of a plurality of selected audio tones from the plurality of audio tones, and (ii) an assembly order of the plurality of selected audio tones;
responsive to an initial selection of the user input, provide a first audible feedback indicating whether the initial selection is a correct starting position for a password entry based on the selection and the assembly order, the first audible feedback comprising first aural content when the initial selection is the correct starting position and the first audible feedback comprising second aural content when the initial selection is not the correct starting position;
receive a subsequent selection of the user input when the initial selection is the correct starting position and providing a third audible feedback comprising a third aural content indicating whether the subsequent selection is a correct subsequent position or incorrect subsequent position for the assembly order; discard the user input when the initial selection is not the correct starting position;
generate the password entry based on the selection and the assembly order indicated by the user input; and
authenticate a user for access to a computer based resource using the password entry.

16. The computer program product of claim 15, wherein the user input is received via a user interface (UI) for entering data, the UI provided on a touch screen of the device.

17. The computer program product of claim 16, wherein the UI is arranged according to a grid of positions, and wherein the UI is configured to provide audible feedback.

18. The computer program product of claim 17, wherein the instructions, when executed by the processor, cause the device to:
responsive to a touch input at a first grid position, provide audible feedback specific to the first grid position according to a policy.

19. The computer program product of claim 18, wherein the policy is modifiable by the user of the computer based resource.

20. The computer program product of claim 15, wherein authenticating the user includes comparing the password entry with a stored credential represented as a pattern-based access code.

* * * * *